United States Patent [19]

Worley et al.

[11] 4,433,135

[45] Feb. 21, 1984

[54] METHOD FOR THE PREVENTION OF HYDROLYSIS OF POLYESTERIFICATION CATALYSTS

[75] Inventors: Ronald W. Worley, Swannanoa, N.C.; David A. Johnson, Norton, Mass.

[73] Assignee: Akzona Incorporated, Asheville, N.C.

[21] Appl. No.: 398,029

[22] Filed: Jul. 14, 1982

[51] Int. Cl.³ .................... C08G 63/04; C08G 63/32
[52] U.S. Cl. .................................. 528/282; 528/274; 528/275; 528/279; 528/283; 528/285
[58] Field of Search .............. 528/272, 274, 275, 279, 528/282, 283, 285

[56] References Cited

U.S. PATENT DOCUMENTS 3,544,523 12/1970 Maxion ............................ 528/282 X
3,852,247 12/1974 Vizurraga ....................... 528/282 X Primary Examiner—Lucille M. Phynes
Attorney, Agent, or Firm—Francis W. Young; Jack H. Hall

[57] ABSTRACT

The use of aluminum sulfate as a dessicant for drying the starting materials used in polymerization reactions employing readily hydrolyzable catalysts is disclosed. The aluminum sulfate is allowed to remain in the reaction mixture during polymerization, and, indeed, may advantageously be allowed to remain in the reaction product without any deleterious effect.

8 Claims, No Drawings

METHOD FOR THE PREVENTION OF HYDROLYSIS OF POLYESTERIFICATION CATALYSTS

FIELD OF THE INVENTION

This invention relates to improved polymerization reactions wherein readily hydrolyzable species are employed as catalysts.

BACKGROUND OF THE INVENTION

There is in wide commercial use today a large number of catalytic agents, useful in polymerization reactions, which possess the disadvantageous trait of being readily hydrolyzable. Because of the water sensitive nature of these catalysts, extreme care must be taken to ensure that the reaction systems in which they are employed are kept anhydrous.

For example, tetrabutyl titanate is well known as a catalyst for esterinterchange polymerizations. U.S. Pat. No. 3,763,109 discloses that segmented thermoplastic copolyesters containing recurring long chain ester units derived from dicarboxylic acids and long chain glycols and short chain ester units derived from dicarboxylic acids and low molecular weight diols may be produced via an esterinterchange reaction wherein tetrabutyl titanate is used as a catalyst. Similarly, U.S. Pat. No. 4,262,114 discloses that certain polyester-polyether segmented copolymers which find use as elastomers may also be produced by way of a polymerization reaction utilizing this catalyst.

While tetrabutyl titanate is an excellent polyesterification catalyst, it must be more or less completely protected from exposure to moisture in order to remain effective due to its extremely hydrolytic nature. It has been reported by Boyd (Boyd, T., *Journal of Polymer Science, Vol. Vii, No.* 6, pp. 591-602, 1951) that when tetrabutyl titanate is exposed to atmospheric moisture at room temperature, it hydrolyzes first to a dimer which subsequently may further react to form a linear polymer. When a substantial amount of water is present (two moles of water per mole of tetrabutyl titanate), the linear polyorthotitanate esters further hydrolyze to $TiO_2$. It is suspected that the dimeric and polymeric hydrolysis products exhibit greatly reduced catalytic activity, if any at all, and $TiO_2$, of course, is totally ineffective as a catalyst.

We have found that if tetrabutyl titanate which has been partially hydrolyzed is used as catalyst, both the rate of reaction and the degree of polymerization is decreased and, in addition, that the resulting polymer may have an undesirable color.

Although water is not evolved in esterinterchange polyesterifications, it is possible for water to be introduced as a contaminant of the reacting species. Accordingly, when tetrabutyl titanate is used as a catalyst, it is imperative that the reactants be substantially anhydrous. Where anhydrous starting materials cannot be economically obtained, they must first be dried. We have found, in particular, that moisture levels in excess of 0.2 wt. % of total starting materials will adversely effect reactions when tetrabutyl titanate is employed as a catalyst.

A great many other catalysts, particularly metal containing catalysts, are similarly hydrolyzable in nature. This class of catalysts includes, especially, metal oxides, metal alkoxides, organometallic compounds (including Grignard reagents), organic metal salts and inorganic metal salts. As a general rule of thumb, if a catalyst contains a metal which forms a water insoluble oxide or hydroxide, then the catalyst will be readily hydrolyzable. Organometallic compounds, since they contain a metal to carbon bond, are uniformly sensitive to moisture.

Representative members of this class of catalysts are:

$GeO_2$
$Sb_2O_3$
$M(Al(OR)_4)$
$M(HZr(OR)_6), M'HZr(OR)_6)_2$
$MH(Ti(OR)_6), M_2(Ti(OR)_6)$
$M'(HTi(OR)_6)_2, M'(Ti(OR)_6)$
$(RR'R''R''')N)_2(Ti(OR)_6)$
$(RR'R''R''')N)H(Ti(OR)_6)$
$Ti(OR)_4, PbR_4$; and
$RMgX$ wherein M represents an alkali metal, M' represents an alkaline earth metal selected from the group consisting of magnesium, calcium and strontium, R represents an alkyl group containing from 1 to 6 carbon atoms, R',R" and R''' each represents a member of the group consisting of R and an aryl group of the benzene series containing from 6 to 9 carbon atoms and X represents a halogen atom.

Representative polymerization reactions utilizing catalysts of the above described class are described in the following U.S. Pat. Nos.: 4,262,114; 3,763,109; 3,377,320; 3,008,933; 2,808,390; 2,805,213; 2,794,795; and 2,744,088 through 2,744,097.

As stated before with respect to the catalysts tetrabutyl titanate, in order to protect water sensitive catalysts, would not be useful for protecting water sensitive catalysts during the course of a reaction.

Surprisingly, we have found that aluminum sulfate is able to bind water extremely tightly and effectively, even at these typical polymerization reaction temperatures. We have also found that this dessicant does not in any way interfere with the course of polymerization reactions or with catalytic activity and that it may, accordingly, be allowed to remain in the reaction starting materials throughout the course of a reaction. Further, we have found that if powdered aluminum sulfate is used, having a particle size which is preferably less than about 5 microns, the dessicant may be left in the reaction product with few, if any, adverse effects. Thus, for example, fine denier synthetic fibers may be melt-spun from polymer containing such finely divided dessicant without clogging of the extrusion spinneret. In order to effectively remove water from reaction starting materials, we have found it preferable to use at least about 500 ppm and up to about 1.5 wt. % of aluminum sulfate, based upon the weight of starting materials.

DETAILED DESCRIPTION OF THE INVENTION

The invention may now be described in detail by referring to the examples given below.

EXAMPLE 1

This example describes several syntheses of a hydantoin polyether-poly(butylene terephthalate) segmented copolymer. Except for the use of aluminum sulfate as a dessicant for drying starting materials and the intentional contamination of the starting materials with known quantities of water, the syntheses such as those listed, from hydrolysis, it is necessary to provide reaction starting materials which are substantially anhydrous. While it is possible to remove water from starting materials by distillation, that is a relatively expensive method which unacceptably raises the cost of the reactants.

It would be greatly preferred to use dessicants to dehydrate a reaction's starting materials, due to the relatively modest cost of these agents. When a reaction is practiced on a commercial scale, however, it is not economical or efficient to filter or otherwise remove a agent, such as a dessicant, from the starting materials prior to running the reaction. Accordingly, if a dessicant is to be used, it must be one which may be allowed to remain mixed with the reactants during the course of the reaction and, indeed, in the reaction product. The dessicant selected must, of course, continue to bind the water it has removed from the starting materials throughout the reaction. Further, its presence in the reaction product must not be injurious and should allow, for example, melt spinning of a polymer into fiber.

It is the object of this invention to provide a dessicant which meets the above two requirements and which may thus be used to dehydrate starting materials for polymerization reactions utilizing readily hydrolyzable catalysts.

SUMMARY OF THE INVENTION

Typically, polymerization, especially stepwise polymerization reactions such as polyesterifications, are run at elevated temperatures in excess of 100° C., the boiling point of water. One might well assume that under these reaction conditions a dessicant would no longer be able to bind and sequester water. For this reason, one might also suspect that dessicants are as described in U.S. Pat. No. 4,262,114, which is incorporated herein by reference. In all, ten syntheses were run according to the method described below. Details and results for each synthesis are given in Table I below. In the case of each synthesis, the starting materials had already been contaminated with a measured quantity of water when they were placed into the reaction vessel. Where aluminum sulfate was used, it was added to the reaction vessel, along with the starting materials, in the form of a powder having a particle size of less than about 5 microns.

General Synthetic method: Dimethyl terephthalate (200 g, 1.03 moles), 1,4-butanediol (126 g, 1.4 moles), hydantoin polyether prepolymer of $M_n \sim 1,000$ (219 g, 0.219 mole) (Dantocol DHE-20, Glyco Inc.), and Antioxidant 330 (4.46 g, 1.06 wt %) (Ethyl Corporation) were added to a 1 kg resin kettle equipped with a mechanical stirrer, a nitrogen inlet tube, a thermocouple connected to a Barber-Coleman recorder, a dual partial condenser of which the lower column was heated at 130° C. by a circulating oil bath and the upper column at 70° C. by a circulating hot water bath. A dual partial condenser was mounted above an automatic liquid dividing distillation head with a high speed condenser. The system was continuously purged with nitrogen and was heated using a heating mantle to 120° C., where low speed stirring was started. When the temperature of the reaction mixture reached 125° C., the catalyst, tetrabutyltitanate (202 mg, 0.10 wt %), was added in 10 ml hexane. The esterinterchange reaction began at 175°–185° C., and the reaction temperature was increased slowly over an 80 minute period to 210° C., distilling off 100% of the theoretical amount of methanol. At this point, the ester-interchange product was poured quickly into a 1 kg polymerization kettle, and the mixture was cooled under a nitrogen blanket to room temperature. The polycondensation was started using a Dowtherm boiler to melt the esterinterchange product. When melting was complete, a vacuum cycle was started and maintained for 85 minutes below 0.1 mm Hg to yield the product.

TABLE I

THE EFFECT OF WATER ON PBT/HPOE ELASTOMER POLYMERIZATION[a]

| Weight[b] %, H$_2$O | Weight % Al$_2$(SO$_4$) | I.V. | COOH meq/kg | Polycondensation Time After Direct Vacuum, min |
|---|---|---|---|---|
| .13 | None | 1.20 | 15 | 85 |
| .20 | None | 1.21 | 11 | 85 |
| .22 | None | .94 | 16 | 85 |
| .28 | None | .34 | 59 | 70 |
| .28 | 1.5 | 1.34 | 23 | 55 |
| .28 | 1.5 | 1.30 | 25 | 85 |
| .28 | 0.5 | 1.35 | 21 | 85 |
| .28 | 0.17 | 1.27 | 0 | 85 |
| .28 | 0.0553 | 1.25 | 0 | 85 |
| .24 | 0.33 | 1.35 | — | 85 |

[a]All elastomer compositions are 50/50 PBT/HPOE 1000.
[b]Total water content as derived from butanediol, Dantacol DHE-20, DMT and TiO$_2$ (where used) is correct to ± 0.05%.

It will be noted from the first four entries in TABLE I that the contamination of the starting materials with water, which was not removed with dessicant, had a markedly deleterious effect on the I.V. on the polymer produced. (An I.V. = 1.2 is about the lower allowable limit for a polymer if it is to be useful for the production of textile yarn.) The last six entries in the table indicate the effectiveness of aluminum sulfate in removing water from the polymerization system, as evidenced by the increase in I.V.

Synthetic fiber was produced by extruding polymer which had been made from wet starting materials and which had been treated with aluminum sulfate. The dessicant was allowed to remain in the extruded polymer. The fiber had an elongation of about 400 to 500% and an initial modulus of about 0.8 g/d.

EXAMPLE 2

In this example, the invention is illustrated as it could be applied to a synthesis such as that described in Example 1 of U.S. Pat. No. 2,805,213, which is incorporated herein by reference. The following synthesis is run twice, once with the addition of aluminum sulfate as dessicant and once without the addition of the same. 420 grams (1.0 mole) P,P'-sulfonyldibenzoic acid dibutyl ester together with 212 grams (1.0 mole) of endo-methylenecyclohexane-2,3-dicarboxylic acid dimethyl ester and 270 grams (3.0 moles) of tetramethylene glycol are placed into a reaction vessel equipped with a stirrer, a distillation column and an inlet for purified nitrogen. The starting materials are known to be contaminated with about 0.28 wt. % of water. In the synthesis where aluminum sulfate is used, it is added to the reaction starting materials at this point, with constant stirring at a temperature of about 125° C. Next, a solution of 0.2 gram of sodium titanium butoxide, dissolved in 5 cc. of butyl alcohol, is added as a catalyst. The mixture is then heated with stirring at 190°–200° C. in a nitrogen atmosphere. A mixture of butyl and methyl alcohols is distilled as esterinterchange takes place, a process taking about two hours. The temperature is then raised to 260° C. and held for about thirty minutes. The pressure is reduced to 0.1 mm. of Hg and stirring is continued for one hour at the same temperature. In the instance where aluminum sulfate is used as a dessicant, a high-viscosity product is obtained. Where aluminum sulfate is not used, the viscosity of the product is significantly reduced.

EXAMPLE 3

In this example, the invention is illustrated as it could be applied to a synthesis such as that described in Example 3 of U.S. Pat. No. 2,805,213.

The following synthesis is run twice, once with the addition of aluminum sulfate as dessicant and once without the addition of the same. Four (4) gram moles of p,p'-sulfonyldibenzoic acid diethylester together with one gram mole of 1,4-endomethylene-cyclohexane-2,3-dicarboxylic acid diethyl ester and 8 gram moles of pentamethylene glycol are placed in a reaction vessel as described in Example 2 hereof. The starting materials are known to be contaminated with about 0.28 wt. % of water. In one batch, aluminum sulfate is added at this point, also as in Example 2. A solution of 0.6 gram of potassium aluminum ethoxide dissolved in 10 cc. of ethyl alcohol is added as the catalyst. The mixture is stirred in an atmosphere of nitrogen at 200°–210° C. The distillation of ethyl alcohol takes place over the course of about two hours. The temperature is then raised to 265° C. where it is held for thirty minutes. The pressure is then reduced to 0.5 mm of Hg. and stirring is continued for about another 1.5 hours. Where the aluminum sulfate dessicant is used, the resulting polymer is of high viscosity. The non-dessicated starting materials yield polymer of relatively low viscosity.

EXAMPLE 4

In this example, the invention is illustrated as it could be applied to a synthesis of polyethylene terephthalate such as that described in Example 1 of U.S. Pat. No. 3,377,320.

The following synthesis is run twice, once with the addition of aluminum sulfate as dessicant and once without the addition of the same. One mole of dimethyl terephthalate together with a molar excess of ethylene glycol is placed in a reaction vessel as described in Example 1 hereof. These starting materials are known to be contaminated with about 0.28 wt. % of water. In the synthesis where aluminum sulfate is used, it is added to the reaction mixture at this time. The system is then continuously purged with nitrogen and is heated with a heating mantle to 120° C., where low speed stirring is started and the system is allowed to reflux. When the temperature of the reaction mixture reaches 125° C., the transesterification catalyst, which may be either manganese benzoate or manganese acetate (0.10 wt. %, based upon the weight of DMT and glycol), is added in 10 ml. hexane. Ester interchange is allowed to proceed while the reaction temperature is slowly increased over an 80-minute period to 210° C., distilling off 100% of the theoretical amount of methanol. At this point, the ester interchange product is poured quickly into a 1 kg. polymerization kettle and the mixture is cooled under a nitrogen blanket to room temperature. Either tin trioxide or amorphous germanium dioxide (0.10 wt. %) in 10 ml. hexane is added as a polycondensation catalyst and polycondensation is carried out as described in Example 1 hereof to yield the product. In the instance where aluminum sulfate is used as a dessicant, a high viscosity polyester is obtained. Where aluminum sulfate is not used, the viscosity of the product is significantly reduced.

In addition to the practice of the invention illustrated by the preceding examples, it will be recognized that aluminum sulfate can be used to protect a wide range of catalysts from hydrolysis. Similarly, this dessicant can be employed in a vast number of polymerization reactions employing such catalysts.

What is claimed is:

1. In a polymerization reaction wherein a readily hydrolyzable species is employed as a catalyst, the improvement which comprises treating the starting materials for said polymerization reaction with aluminum sulfate in order to remove moisture therefrom.

2. The improved polymerization reaction of claim 1, wherein tetra-butyltitanate is employed as said catalyst.

3. The improved polymerization reaction of claims 1 or 2, wherein said reaction is a polyesterification.

4. The improved reaction of claim 1, wherein said aluminum sulfate remains in the product of said reaction.

5. The improved reaction of claims 1 or 4, wherein the aluminum sulfate is added to the starting materials in the form of a finely divided powder having a particle size of less than about 5 microns.

6. The improved reaction of claim 1, wherein said catalyst is selected from the group comprising:
$GeO_2$
$Sb_2O_3$
$M(Al(OR)_4)$
$M(HZr(OR)_6), M'HZr(OR)_6)_2$
$MH(Ti(OR)_6), M_2(Ti(OR)_6)$
$M'(HTi(OR)_6)_2, M'(Ti(OR)_6)$
$(RR'R''R'''N)_2(Ti(OR)_6)$
$(RR'R''R'''N)H(Ti(OR)_6)$
$Ti(OR)_4, PbR_4$; and
$RMgX$
wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and X represents a halogen atom.

7. The improved reaction of claim 1, wherein said catalyst is selected from the group comprising: metal oxides, metal alkoxides, organometallic compounds (including Grignard reagents), organic metal salts and inorganic metal salts.

8. The improved reaction of claim 1, wherein at least about 500 ppm and up to about 1.5 weight percent of aluminum sulfate, based upon the weight of starting materials, is used to treat said starting materials.

* * * * *